(12) United States Patent
Jin et al.

(10) Patent No.: US 7,515,153 B2
(45) Date of Patent: Apr. 7, 2009

(54) MAP GENERATION DEVICE, MAP DELIVERY METHOD, AND MAP GENERATION PROGRAM

(75) Inventors: Haomin Jin, Fuchu (JP); Kazuaki Iwamura, Nishitokyo (JP); Nobuhiro Ishimaru, Tokyo (JP); Takashi Hino, Yokohama (JP); Yoshiaki Kagawa, Yokohama (JP)

(73) Assignees: Hitachi, Ltd., Tokyo (JP); Hitachi Software Engineering Co., Ltd., Tokyo (JP)

( * ) Notice: Subject to any disclaimer, the term of this patent is extended or adjusted under 35 U.S.C. 154(b) by 0 days.

(21) Appl. No.: 10/759,234

(22) Filed: Jan. 20, 2004

(65) Prior Publication Data

US 2004/0263514 A1 Dec. 30, 2004

(30) Foreign Application Priority Data

May 19, 2003 (JP) ............................... 2003-140472

(51) Int. Cl.
*G06T 11/20* (2006.01)
(52) U.S. Cl. ...................................... 345/440; 345/420
(58) Field of Classification Search ......... 701/200–226; 345/419, 420, 440
See application file for complete search history.

(56) References Cited

U.S. PATENT DOCUMENTS

| 4,811,409 | A | * | 3/1989 | Cavan | ......................... 382/144 |
|---|---|---|---|---|---|
| 5,475,507 | A | * | 12/1995 | Suzuki et al. | ................ 358/500 |
| 5,828,377 | A | * | 10/1998 | Muro et al. | ................... 345/420 |
| 5,945,976 | A | * | 8/1999 | Iwamura et al. | .............. 345/419 |
| 6,523,024 | B1 | * | 2/2003 | Yajima et al. | ................... 707/3 |
| 6,535,812 | B2 | * | 3/2003 | Satoh et al. | ................... 701/208 |
| 6,619,406 | B1 | * | 9/2003 | Kacyra et al. | ................. 172/4.5 |
| 6,982,712 | B2 | * | 1/2006 | Ohto | ........................... 345/420 |
| 2004/0111213 | A1 | * | 6/2004 | Iwamura et al. | .............. 701/208 |

FOREIGN PATENT DOCUMENTS

| CN | 1399223 | 2/2003 |
|---|---|---|
| JP | 2000-310940 | 11/2000 |

OTHER PUBLICATIONS

Markus Niederost, Detection and reconstruction of buildings for a 3-D landscape model of Switzerland, 2000,Institute of Geodesy and photogrammetry(IGP), Swiss Federal Institute of Technology Zurich (ETHZ),Proceedings of UM3/2000 Workshop, Tokyo 2000.*

(Continued)

*Primary Examiner*—Kee M Tung
*Assistant Examiner*—Javid A Amini
(74) *Attorney, Agent, or Firm*—Antonelli, Terry, Stout & Kraus, LLP.

(57) ABSTRACT

To provide a map generation device according to the present invention which extracts a polygon shape of a building having a complex upper portion structure from a wide area image. The map generation device includes an image appointment unit that receives appointment of at least one position in a building existing within an aerial photograph, a polygon extraction unit that extracts a building region based on a result of discriminating a color around the appointed position and extracts a polygon line of the building region, and a vector generation unit that generates a vector of the polygon line of the building region.

12 Claims, 19 Drawing Sheets

OTHER PUBLICATIONS

Markus Niederost, Reliable Reconstruction of Buildings for Digital Map Revision, 2000, Institute of Geodesy and photogrammetry(IGP), Swiss Federal Institute of Technology Zurich (ETHZ), International Archives of Photogrammetry and Remote Sensing, vol. XXI.*

Markus Niederost, Automated update of building information in maps using medium-scale imagery (1:15,000), 2001, Institute of Geodesy and photogrammetry(IGP), Swiss Federal Institute of Technology Zurich (ETHZ).*

Markus Niederost, Automated update of building information in maps using color aerial imagery (1:15,000), 2001, Institute of Geodesy and photogrammetry(IGP), Swiss Federal Institute of Technology Zurich (ETHZ).*

Noronha, Nevatia, Detection and modeling of buildings from multiple aerial images, May 2001, IEEE Transactions on vol. 23, Issue 5.*

Noroha, Nevatia, Detection and description of buildings from multiple aerial images, Jun. 1997, Computer Vision and Pattern Recognition, pp. 588-594.*

Yanlin, Sawhney, Kumar, Hsu, Learning-based building outline detection from multiple aerial images, Dec. 2001, Computer Vision and Pattern Recognition, pp. II-545-II-552 vol. 2.*

Byong Mok Oh; Max Chen; Julie Dorsey; Fredo Durand; with a title of "Image-Based Modeling and Photo Editing".*

Frederick M. Weinhaus; Venkat Dev, vol. 29, Issue 4 (Dec. 1997) pp. 325-365, Year of Publication: 1997 ISSN:0360-0300, title of "Texture mapping 3D models of real-world scenes".*

Paul E. Debevec Jitendra Malik, Recovering High Dynamic Range Radiance Maps from Photographs, 1Computer Science Division, University of California at Berkeley, Berkeley, CA 94720-1776.*

Xuehui Liu, Hanqiu Sun, Enhua Wu, Oct. 2000, A Hybrid Nethod of image Synthesis in IBR for Novel Viewpoints.*

How the virtual inspires the real: From images to 3D models Marc Pollefeys, Luc Van Gool Jul. 2002 communications of the ACM, vol. 45 Issue 7 Publisher: ACM Press.*

Modeling and rendering architecture from photographs: a hybrid geometry- and image-based approach Paul E. Debevec, Camillo J. Taylor, Jitendra Malik Aug. 1996 Proceedings of the 23rd annual conference on Computer graphics and interactive techniques SIGGRAPH '96 Publisher: ACM Press.*

Extracting Buildings from Aerial Topographic Maps Reda E. Fayek; Andrew K. C. Wong Systems Design Engineering, IEEE 1996, pp. 401-404.*

Suyoung Seo and Toni F. Schenk with title of A study of integration methods of aerial imagery and LIDAR data for a high level of automation in 3D building reconstruction Proceedings of SPIE—vol. 5099 Multisensor, Multisource Information Fusion: Architectures, Algorithms, and Applications 2003, Belur V. Dasarathy, Editor, Apr. 2003, pp. 65-76.*

3D Modelling of Topographic Objects by Fusing 2D Maps and LIDAR Data Sandar Oude Elberink and George Vosselman International Institute for Geo-information Science and Earth Observation (ITC)—(oudeelberink, vosselman)@itc.nl Commission IV, WG IV/4.*

Automation in Building Reconstruction. Armin Gruen, Zurich., Photogrametric week 1997, pp. 175-186.*

ESRI "Geography Matters" white paper Sep. 2002, pp. 1-11.*

Lin, et al., "Building Detection and Description from a Single Intensity Image", Computer Vision and Image Understanding, vol. 72, No. 2, Nov. 1998, pp. 101-121, Article No. IV980724.

Jaynes, et al., "Task Driven Perceptual Organization for Extraction of Rooftop Polygons", Applications of Computer Vision, 1994, Proceedings of the Second IEEE Workshop, pp. 152-159.

Japanese article entitled "Practice of Photogrammetry", with English translation of p. 91, section 5.1.

* cited by examiner

X : appointed position

● : the detected pixels belonging to building region

○ : unknown pixels

FIG.12

| Pattern NO. | shape correction |
|---|---|
| P1 | |
| P2 | |
| P4 | |
| P5 | | before correction      after correction

| No. | shape patterns of cross-lines | region integration |
|---|---|---|
| T |  |  |
| X |  |  |
| Y |  |  |

FIG.16

| No. | shape patterns of cross-lines | region integration |
|---|---|---|
| V1 | (Cross-lines, building region, Appointed position) | |
| V2 | | |
| V3 | | |

MAP GENERATION DEVICE, MAP DELIVERY METHOD, AND MAP GENERATION PROGRAM

BACKGROUND OF THE INVENTION

1. Field of the Invention

The present invention relates to a map generation device that generates a map by extracting a polygon shape of a building roof from an aerial photograph (a photograph taken from a satellite or an airplane).

2. Description of the Related Art

Up to now, examples of a method of generating a map from an aerial photograph include a method of using an analytical plotter to manually trace a polygon shape of a building shown in an image, and a method of automatically extracting a building polygon shape from an image.

In the method of using an analytical plotter, two images photographed with parallax are estimated and aligned to generate a stereo image. Then, an operator extracts a building polygon shape from the stereo image by a handle operation (see, for example, Ujihisa Kimoto, *Practice Of Photogrammetry*, Sankaido. P.91-97).

Meanwhile, in the method of automatically extracting a building polygon shape, a monocular image is used along with information including a position, an angle, and a sun direction where the image was photographed to extract regions of a rectangular roof, a wall, a shadow, and the like based on linearity and positional relationships involved in information on lines extracted as edge images. Thus, existence of a building can be discriminated. For example, there is proposed a method of extracting a rectangular roof shape by setting information on the position, the angle, and the sun direction where the image was photographed as known conditions, and tentatively setting a building structure based on the line information obtained from the edge images (see, for example, C. O. Jaynes, two others, "Task Driven Perceptual Organization for Extraction of Rooftop Polygons", Proceedings of ARPA Image Understanding workshop, 1994, P.359-365). There is also proposed a method of extracting stereo information on a rectangular building by setting information on the sun direction and a camera orientation where the image was photographed as known conditions, and discriminating local characteristics, relative positional relationships, and the like involved in the line information of a roof, a wall, and a shadow (see, for example, C. Lin, one other, "Building Detection and Description from a Single Intensity Image", Computer Vision and Image Understanding, Vol.72, No.2, November 1989, P.101-121).

According to the above-mentioned conventional method of generating a map using an analytical plotter, extraction of a building polygon shape is conducted by the operation of an operator, making it difficult to correctly trace the building polygon shape. Further, the above-mentioned conventional method of automatically extracting a building region can be applied only to a building whose roof shape has a simple structure such as a flat roof shape. The building region cannot be extracted when sunlight falls on a roof such as a gable roof at different angles, producing gray contrast, or when a building has a structure such as an exhaust tower on its roof.

SUMMARY OF THE INVENTION

It is an object of the present invention to (1) extract a building polygon shape from a wide area image, (2) generate a map efficiently by reducing operations conducted by an operator, and (3) extract a polygon shape of a building having a complex upper portion structure such as a gable roof or an exhaust tower.

According to the present invention, there is provided a map generation device including an image appointment unit that receives appointment of at least one position in a building existing within an aerial photograph, a polygon extraction unit that extracts a building region based on a result of discriminating a color around the appointed position and extracts a polygon line of the building region, and a vector generation unit that generates a vector of the polygon line of the building region.

According to the present invention, the building polygon shape is extracted in a position where a building region is appointed in advance, enabling the extraction of a wide area building polygon shape. In addition, by appointing a building roof, a processing range for estimation of the building roof can be limited, enabling the extraction of a polygon shape of the entire building.

Accordingly, map generation becomes easy, and the map generation can be realized in a short period of time and at low cost.

BRIEF DESCRIPTION OF THE DRAWINGS

FIG. 12 is a diagram for explaining correction of polygon lines according to the embodiment of the present invention.

FIG. 16 is a diagram for explaining other integration patterns for a building region according to the embodiment of the present invention.

DETAILED DESCRIPTION OF THE PREFERRED EMBODIMENT

Figure 1:
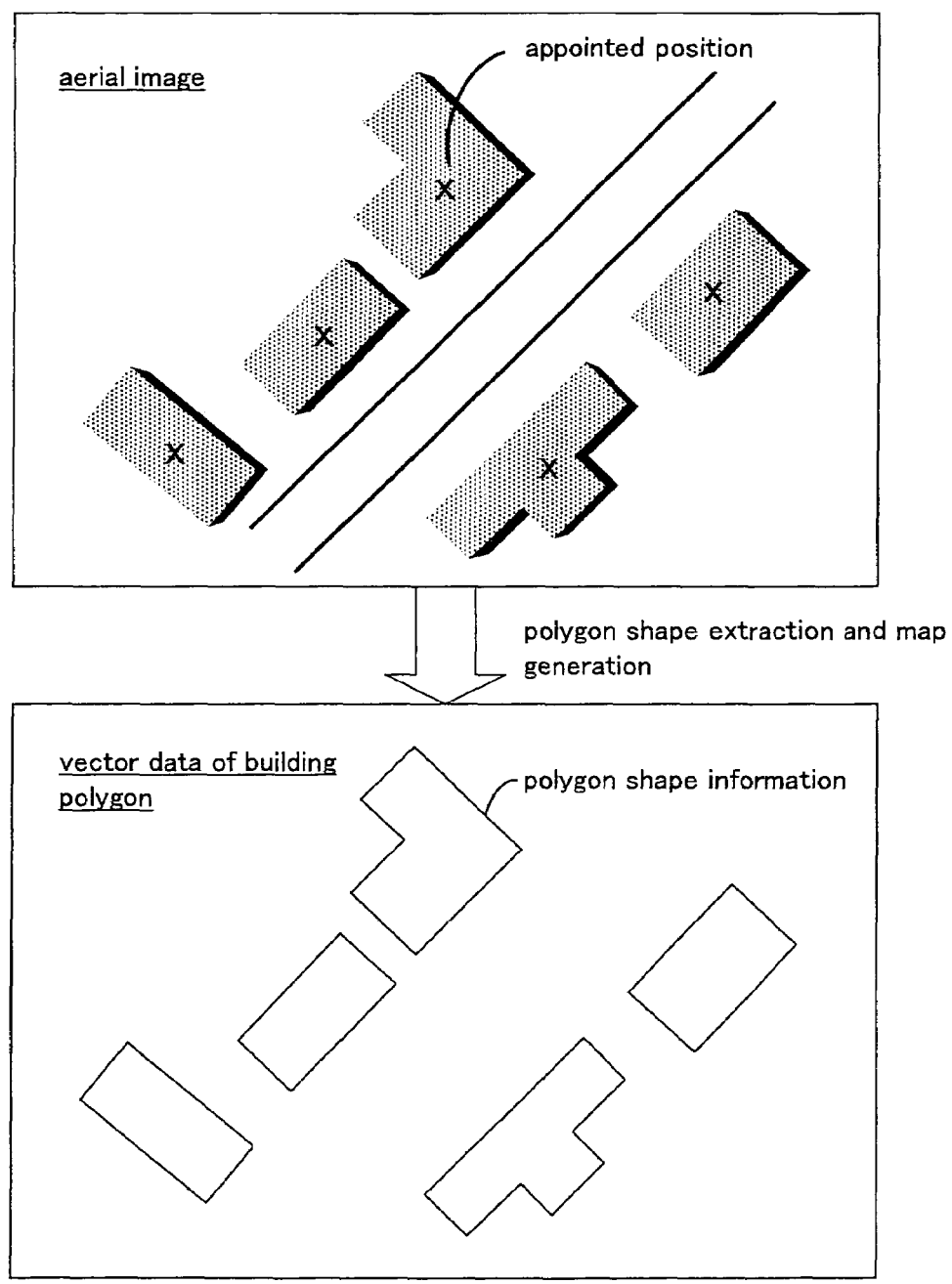
FIG. 1 is a diagram for explaining polygon shape extraction and map generation based on an appointed position.

A map generation device as described in the present invention is aimed at map generation using a monocular image as well as an ortho image and a stereo image. Also, the map generation device generates a map from a monochrome image as well as from a color image. Instead of conducting manual plotting or fully automatic recognition, as shown in FIG. 1, the map generation device appoints a building roof on an image to limit a processing range for estimation of the building roof, extracts a polygon shape of a building region that includes an appointed position, and projects the polygon shape of the building on a ground, thus obtaining a figure in a map.

Figure 2:
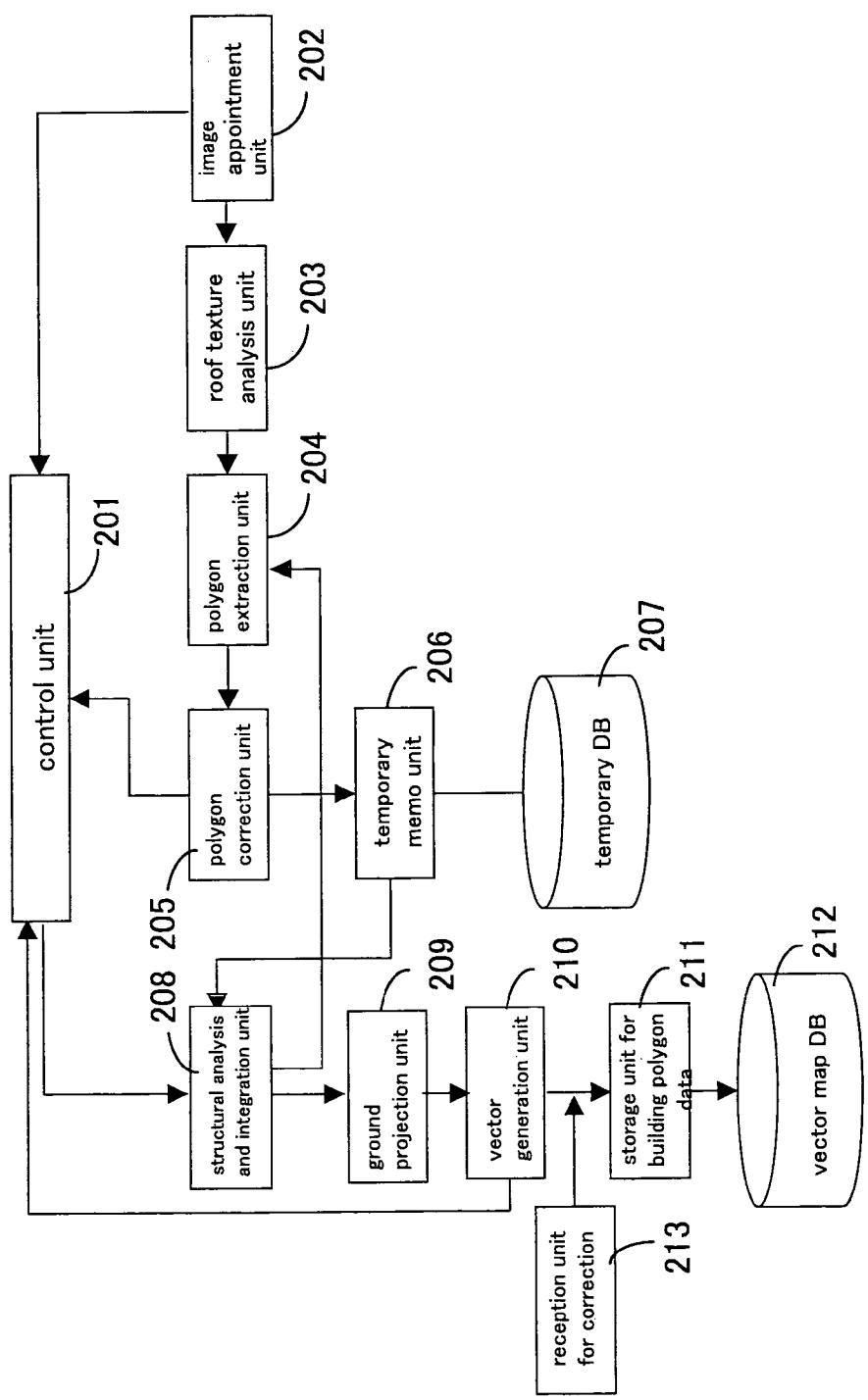
FIG. 2 is a functional block diagram of a map generation device according to an embodiment of the present invention.

FIG. 2 is a functional block diagram of a map generation device according to an embodiment of the present invention.

The map generation device according to the present invention includes a control unit 201, an image appointment unit 202, a roof texture analysis unit 203, a polygon extraction unit 204, a polygon correction unit 205, a temporary memo unit 206, a temporary database 207, a structural analysis and integration unit 208, a ground projection unit 209, a vector generation unit 210, a storage unit for building polygon data 211, a vector map database 212, and a reception unit for correction 213.

The control unit 201 supervises the map generation device according to this embodiment, and controls an operation of each unit in a building polygon shape extraction process. In other words, the control unit 201 determines the next function to be activated in a building polygon shape extraction process. More specifically, the control unit 201 receives instructions relating to image input, start and end of building polygon shape extraction, result deletion, result accumulation, and building-structural integration, monitors an execution state of the building polygon shape extraction process, and determines the function to be activated next.

The image appointment unit 202 receives appointment of at least one position on a building of an aerial photograph whose polygon shape is to be extracted.

The roof texture analysis unit 203 analyzes features such as colors and textures around the position whose input instruction is received by the image appointment unit 202 to thereby determine sample colors for matching, and a discrimination threshold and a searching range for building region detection.

The polygon extraction unit 204 discriminates a similarity (for example, a similarity in gray level) to the sample colors for matching determined by the roof texture analysis unit 203 within the searching range for region detection also determined by the roof texture analysis unit 203, and extracts building region pixels having a similar color to the sample colors for matching. Then, the polygon extraction unit 204 uses information on a boundary around the extracted building region to correct the building region range, and uses the boundary of the building region to extract polygon lines according to an inclination angle of the building region.

The polygon correction unit 205 uses a linking pattern to correct the polygon lines extracted by the polygon extraction unit 204, and uses boundary information of a plurality of building regions to correct the positions of the polygon lines.

The temporary memo unit 206 temporarily stores intermediate result data for the building polygon shape corrected by the polygon correction unit 205.

The temporary database 207 accumulates the intermediate result data for the building polygon shape.

In the case where the building roof has distinct colors or distinct structures such as a building with a gable roof, the structural analysis and integration unit 208 estimates the building region based on building structural knowledge, and integrates the building region. In the case where the entire polygon line cannot be extracted by just one appointment, a plurality of positions are appointed to integrate the appointed building regions.

In order to convert the extracted building polygon shape into a diagram on a ground, the ground projection unit 209 uses a ridge line of a vertical direction of the building to project the polygon line of the building region on the ground.

The vector generation unit 210 generates the building polygon shape based on vectors from the polygon line of the building region obtained by the ground projection unit 209.

The storage unit for building polygon data 211 stores vector information of the polygon lines of the building region generated conclusively.

The vector map database 212 accumulates vector map information obtained from the image.

The reception unit for correction 213 receives correction of the generated vector map information conducted by an operator.

Figure 3:
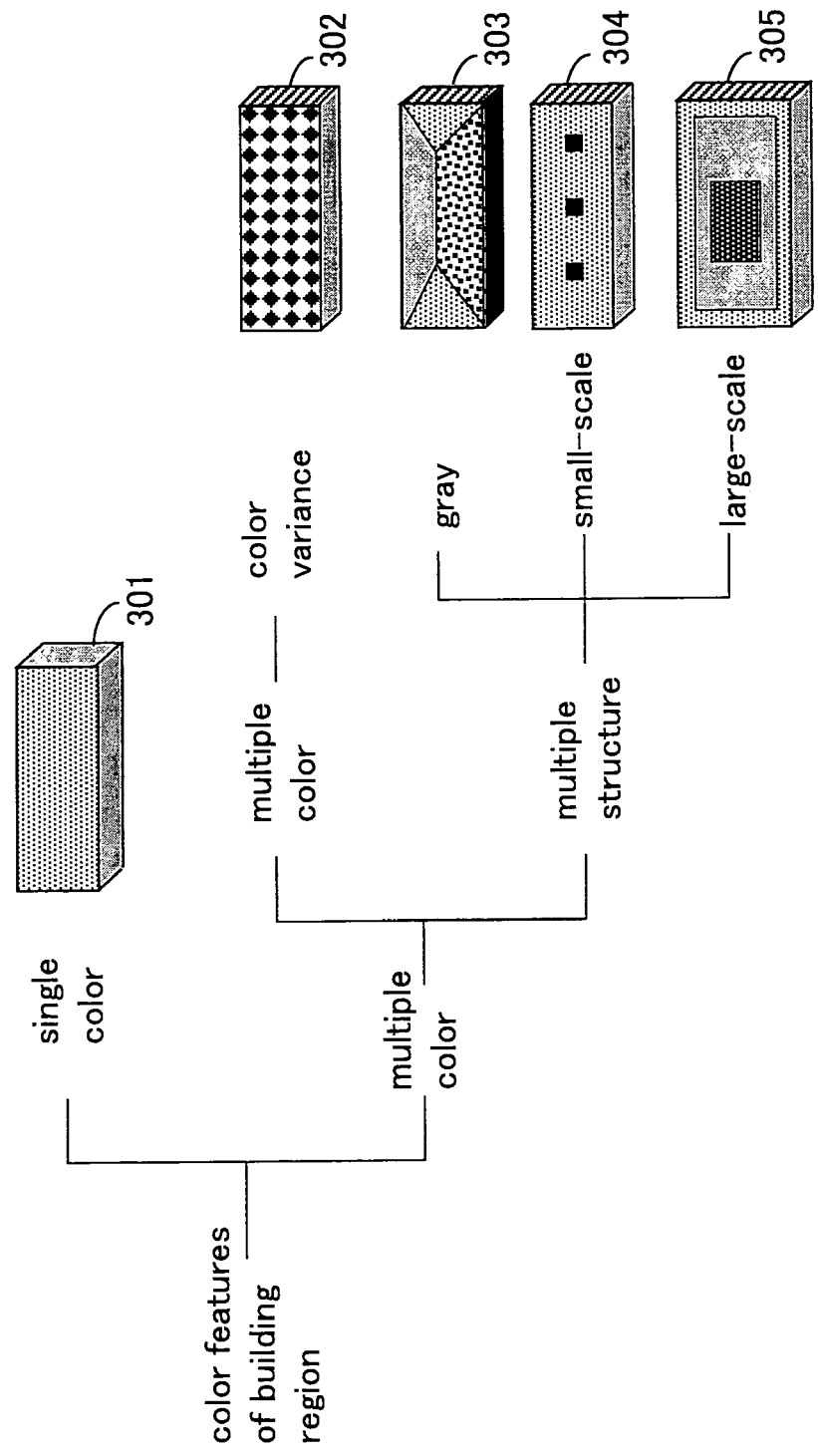
FIG. 3 is a diagram for explaining feature classification of buildings.

FIG. 3 is a diagram for explaining feature classification of buildings.

The buildings can be classified into a building 301 whose upper structure (roof) has a single color (single gray level) and buildings 302 to 305 whose roofs each have a combination of a plurality of colors (combination of multiple colors). The buildings having the combination of a plurality of colors can be classified into the building 302 whose roof has a partial color variance (for example, a portion exhibiting a color variance due to exposure to wind and rain) and the buildings 303 to 305 each having multiple colors due to multiple structures of the roof. The buildings having the multiple structures can be classified into the building 303 having portions with different gray levels due to different lighting angles of sunlight because its roof is not flat, the building 304 provided with a small-scale structure such as an exhaust tower or a bay window, and the building 305 whose roof is constructed of large-scale multiple structures.

The features of those building roofs can be discriminated based on gray levels in the case of using a monochrome photograph, but need to be discriminated based on the colors of the roof in the case of using a color photograph. In the latter case, the features are discriminated by obtaining a gray level for each of the three primary colors (red, green, and blue). That is, the colors are discriminated based on the gray levels. Also, the sample colors for matching which will be described later are defined by the respective gray levels of the three primary colors.

Figure 4:
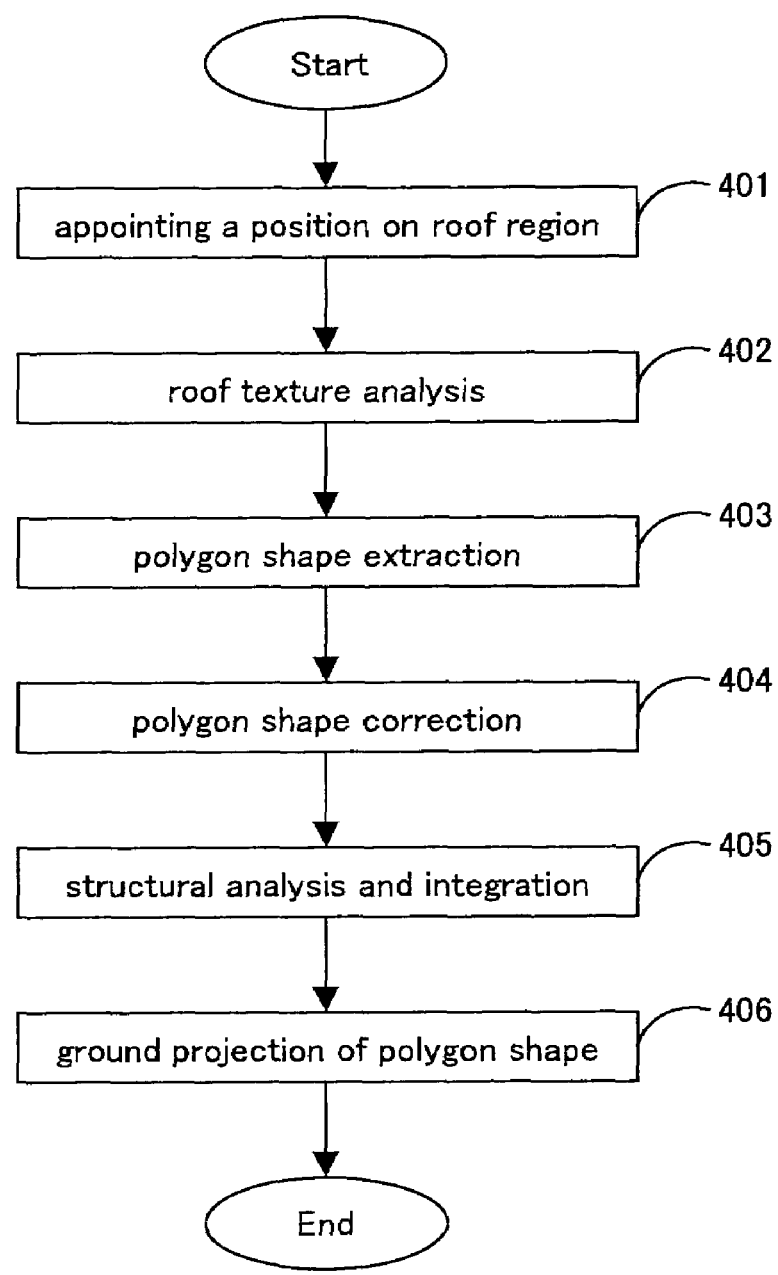
FIG. 4 is a flowchart of a building polygon shape extraction process according to the embodiment of the present invention.

FIG. 4 is a flowchart of the building polygon shape extraction process according to the embodiment of the present invention.

First, an operator appoints a position on a building whose polygon shape is to be extracted and which is shown in an aerial photograph (step 401). It should be noted that the appointment of the position on the building may be conducted for one point on the building or a region having a certain area. Then, the gray levels or the textures of a roof of the appointed building are analyzed, and sample pixels for matching are extracted based on analysis results for gray levels of the building roof, and the sample colors for matching, the discrimination threshold for matching, and a searching range for region detection are determined (step 402).

It is then determined whether the pixels within the searching range for region detection are within the range of the threshold with respect to the sample colors for matching set in step 402, and the polygon shape of the building roof is extracted (step 403).

Next, a polygon shape correction process is conducted (step 404). In the polygon shape correction process, the polygon lines extracted in step 403 are matched with a predetermined linking pattern to correct the building polygon shape. Further, the boundary of the building region is used to correct the positions of the polygon lines.

Next, a structural analysis and integration process is conducted (step 405). In the structural analysis and integration process, the structure of the building roof is analyzed, and the spreading of the roof is recognized. Here, the building roof is estimated based on roof structural knowledge, the building region is also estimated, and these pieces of information are integrated. In the case where the entire building region cannot be extracted by just one appointment, a plurality of positions are appointed to extract a plurality of building regions and integrate the extracted building regions.

Next, a process for ground projection of a polygon shape is conducted (step 406). The polygon line of the building region which is extracted by the processes of up to step 405 is not limited to a line at a ground level. A high-rise building in the periphery of the aerial photograph has been photographed from an inclined direction, making it necessary to convert the building roof into a ground-level diagram. Therefore, the ridge line of the vertical direction of the building is used to project the polygon lines of the building region on the ground.

Subsequently, description will be made of the details of the building polygon shape extraction process shown in FIG. 4.

Figure 5:
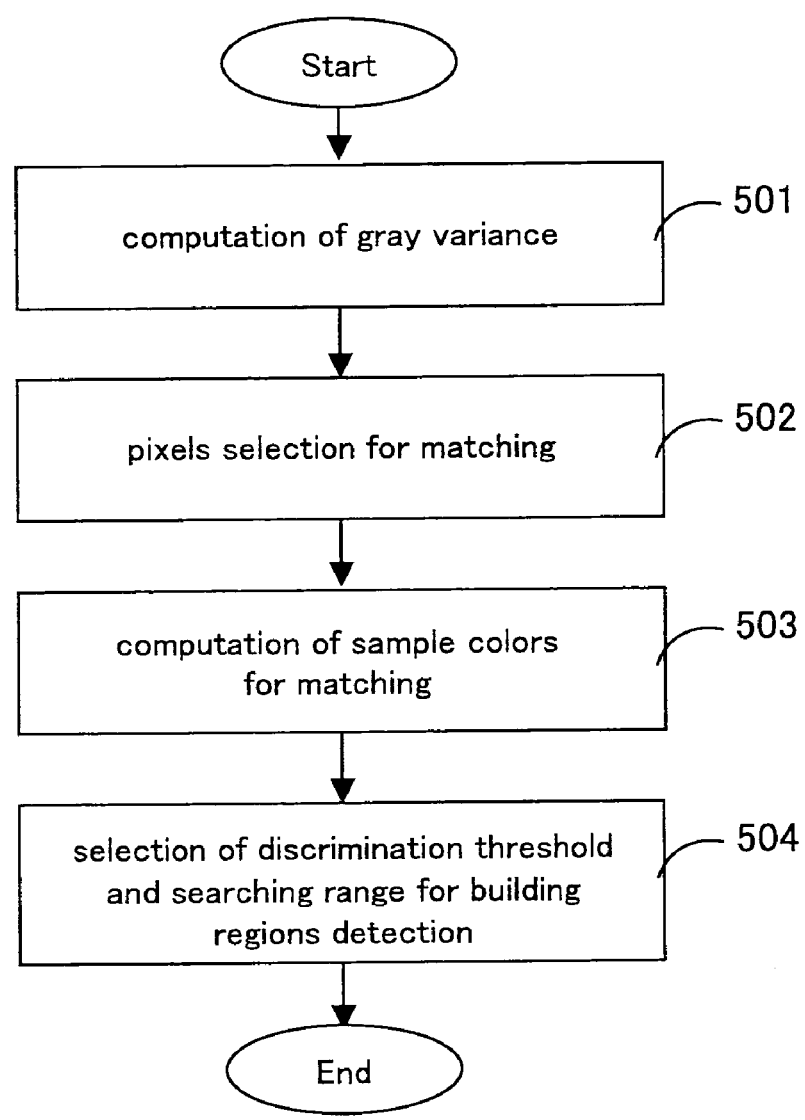
FIG. 5 is a flowchart of a building roof texture analysis process according to the embodiment of the present invention.

FIG. 5 is a flowchart of a building roof texture analysis process (step 402 of FIG. 4).

Specifically, a gray-level variance of pixels is first computed around the appointed position (step 501). In the gray-level variance computation process, pixels included in a predetermined region (for example, 10 dots×10 dots) with the position appointed in step 401 being set at its center are extracted, and the gray-level variance of the extracted pixels is computed.

Next, the sample pixels for matching are selected (step 502). In the process for selection of the sample pixels for matching, based on a comparison result between the gray-level variance of the pixels around the appointed position obtained in step 401 and the predetermined threshold, the selection is made of the pixels for determining the sample colors for matching for building region extraction. That is, if the gray-level variance is larger than the predetermined threshold, only the appointed position is selected for the sample pixel for matching. This is because variation in gray level is large, so that the discriminating threshold becomes too large by the below-described method of determining the discriminating threshold-based on the variance, making it difficult to accurately extract the building region.

Figure 6:
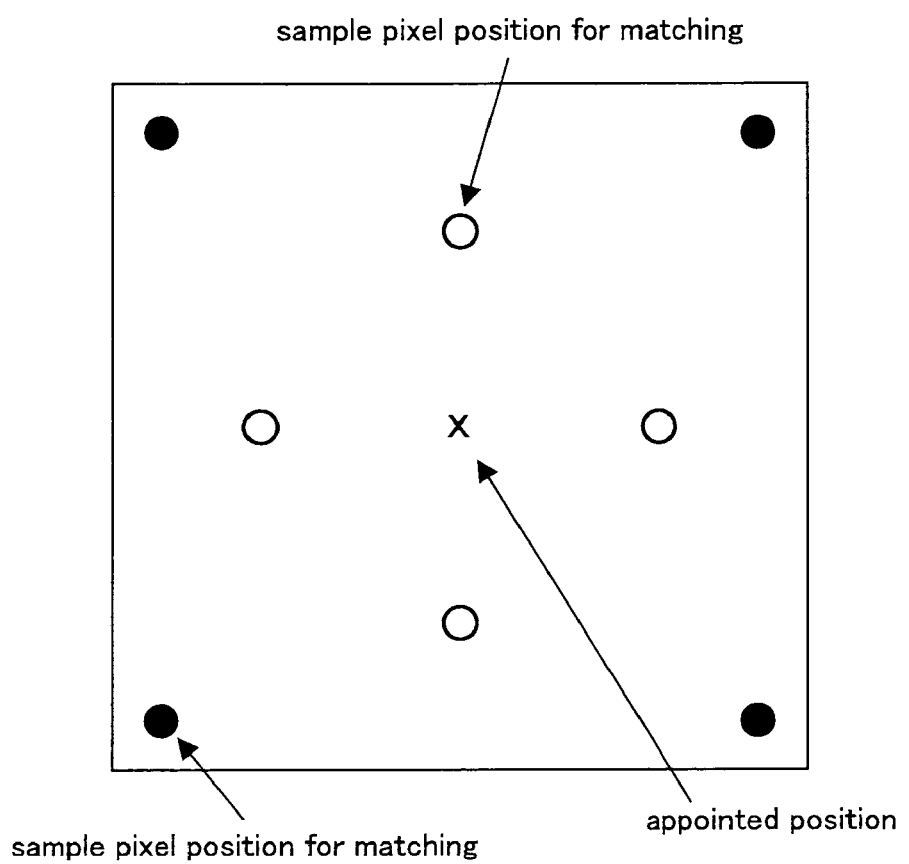
FIG. 6 is a diagram for explaining selection of sample pixels for matching according to the embodiment of the present invention.

On the other hand, if the gray-level variance is equal to or smaller than the predetermined threshold, a predetermined number of the sample pixels for matching are selected from the predetermined region with the appointed position being set at its center. The predetermined region may be set to a range of approximately 15 dots×15 dots because a certain area is necessary for the range to be used for matching. FIG. 6 shows the selection of the sample pixels for matching. The appointed position is set as the center of the predetermined range, and positions (for example, four vertices for the predetermined region being a quadrangle) that are most apart from the appointed position in diagonal directions of the predetermined region are selected as the sample pixels for matching (represented by ● in the drawing).

In addition, positions that are apart from the already-determined five sample pixel positions for matching (including the appointed position) are selected as the sample pixels for matching. For example, positions that are located between the positions on lines passing the appointed position lengthwise and crosswise are selected as the sample pixels for matching (represented by O in the drawing). Accordingly, nine sample pixels for matching including the appointed position can be selected.

Next, the sample colors (gray levels) for matching are computed (step 503). In the process for computation of the sample colors for matching, an average is computed for the colors (gray levels) of the pixels included in a predetermined region with each of the sample pixels for matching selected in step 502 being set at its center. Information on the predetermined region may be obtained from a neighboring region (for example, 3 dots×3 dots) with the sample pixel for matching being set at its center in order to compute a gray-level average and reduce noise.

Next, the discrimination threshold and the searching range for building region detection are selected (step 504). In the process for selection of the discrimination threshold and the searching range for building region detection, the discrimination threshold for building region detection is first determined based on the color (gray-level) variance obtained in step 501. More specifically, by referencing a matching table that stores discrimination thresholds corresponding to the gray-level variances divided into several ranges, the discrimination threshold for building region detection is determined based on the gray-level variance. The discrimination thresholds stored in the matching table are set such that when the gray-level variance is large (when the colors are dispersed), a wide-range region is included in the building region. It should be noted that the discrimination threshold may be operated using the gray-level variance as a predetermined function (for example, a linear function for multiplying the gray-level variance by a predetermined value) to determine the discrimination threshold for building region detection.

The searching range for building region detection is determined based on the color (gray-level) variance obtained in step 501. The searching range is set such that when the gray-level variance is small, peripheral pixels in a wide range are searched through, and when the gray-level variance is large, peripheral pixels in a narrow range are searched through. More specifically, by referencing a matching table that stores searching ranges corresponding to steps in gray-level variance, the searching range for building region detection is determined based on the gray-level variance. It should be noted that the searching range for building region detection may be operated using the gray-level variance as the predetermined function (for example, the linear function for multiplying the gray-level variance by the predetermined value) to determine the searching range for building region detection.

Thus, In the building roof texture analysis process (FIG. 5), the features of the colors or the textures of an image within a predetermined range adjacent to the position appointed in step 401 are analyzed (step 402), and based on analysis results for building roof textures, the sample colors for matching, the discrimination threshold for matching, and the searching range for region detection are determined as parameters for region extraction. Accordingly, even in the case where the building roof has a uniform color or has different colors depending on positions thereon, the appropriate parameters for region extraction can be determined.

Figure 7:
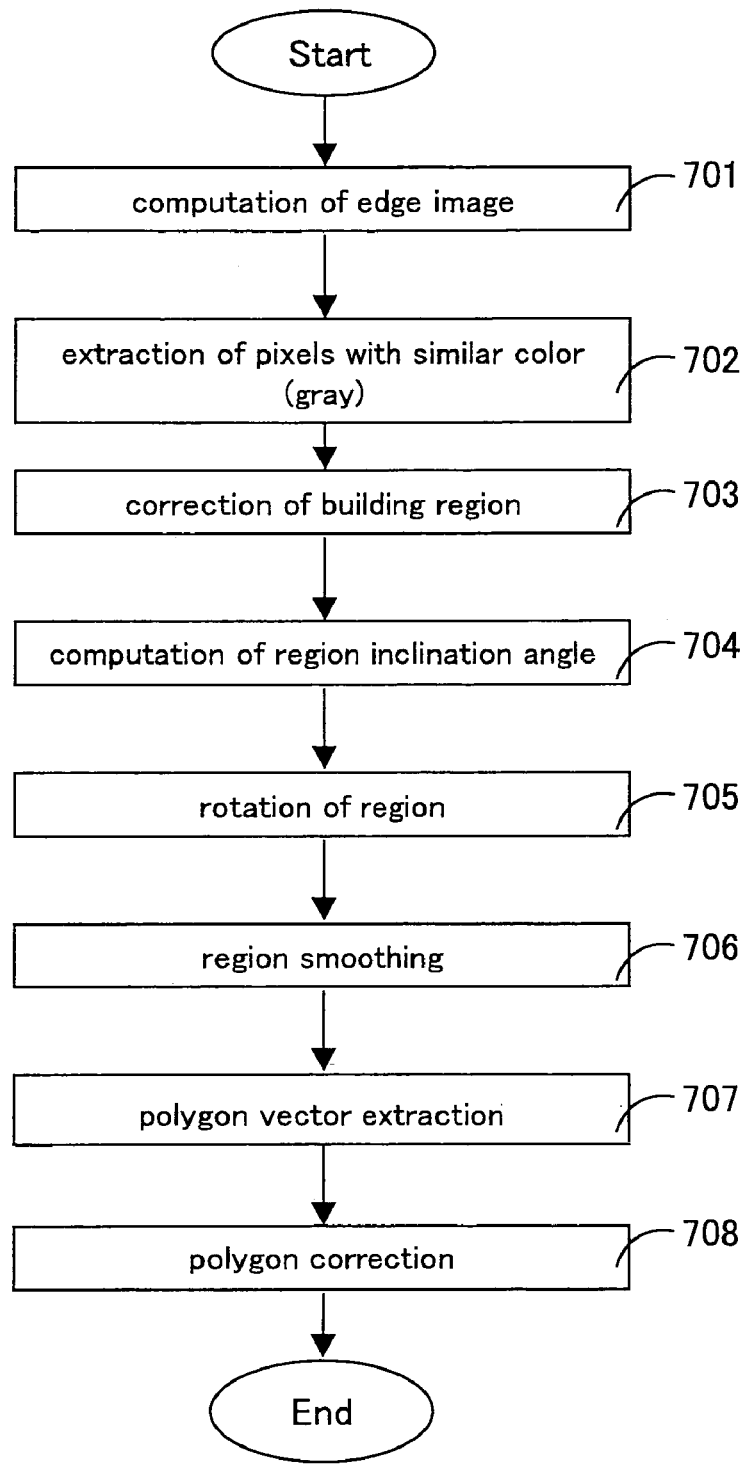
FIG. 7 is a flowchart of a polygon shape extraction process according to the embodiment of the present invention.

FIG. 7 is a flowchart of a polygon shape extraction process (step 403 of FIG. 4).

The steps for the extraction of the polygon lines of the building region are divided into two groups consisting of the building region extraction (steps 701 to 706) and region polygon line extraction (steps 707 and 708).

In the building region extraction process, the sample colors for matching (gray levels) obtained in step 503 and the parameters for region extraction (the discrimination threshold for building region detection and the searching range for building region detection) obtained in step 504 are used to extract the building region. In this case, the building region detection is conducted in reference to the pixels around the appointed position by following four rules described below.

(1) The pixels to be included in the building region are extracted from the searching range for region detection around the building region that has been already extracted.

(2) The color (gray level) of the pixel is compared with the neighboring pixels within the building region that has been already extracted as well as with the sample pixels for matching, and a change amount of the color (gray level) is determined, thereby discriminating whether the searched pixel belongs to the building region or not.

(3) In the case where the colors (gray levels) of the pixels in the building region that has been already extracted and those of the searching range exhibit a sudden change, it is determined that the boundary of the building has been reached, and the detection stops. Also, a region beyond the extracted building boundary is not extracted as the building region.

(4) The building region is corrected using the information on the building region that has been already extracted and lines around the building region.

Further, in the polygon line extraction process according to this embodiment, the vertices of the polygon of the building region are extracted, and the polygon is traced to extract a closed polygon shape.

More specifically, the edge image is first computed (step 701). In the edge image computation process, a direction and changes in color (gray level) with respect to the adjacent pixels are computed for every pixel. Then, a direction indicating a great gray gradient for the respective pixels is obtained from the direction indicating the largest change in color. The direction of the gray gradient is represented, for example, within a range of 0° to 180° by setting a north-south direction as a reference axis (the north-south direction as 0°, and an east-west direction as 90°). Also, the color (gray level) is converted into an 8-bit digital form, and a change value is represented by 0 to 255 in 256 steps. The pixels having a larger change value in color than the predetermined threshold are detected to be utilized as edge pixels.

Next, the pixels with a similar color (gray level) are extracted (step 702). In the process for extraction of the pixels with a similar color, the pixels having a color (gray level) similar to the sample color (gray level) for matching obtained in step 503 are extracted. Here, in the case where the number of the pixels of the edge image that is included in the predetermined region around the pixels of the building region already extracted is smaller than the predetermined threshold, the pixels with a similar color (gray level) are set as candidates for the building region. In the other case where the number of the pixels of the edge image that is included in the predetermined region around the pixels of the building region already extracted is larger than the predetermined threshold, the pixels with a similar color (gray level) are not set as the candidates for the building region because the extracted pixels are discriminated as being close to the boundary. Then, the sample pixels for matching selected in the former case are set as representative pixels for the building region.

In the case where only a pixel of the appointed position is selected for the sample pixel for matching in step 502 (in the case where only a single sample pixel for matching is selected), a difference between the color (gray level) of the sample pixel for matching and the colors (gray levels) of the candidate pixels is computed using a Euclidean distance. Then, based on the comparison result between a gray-level difference and the discrimination threshold for building region detection, it is determined whether the candidate pixels are set as the pixels for the building region or not. More specifically, when the gray-level difference (Euclidean distance) is smaller than the discrimination threshold for building region detection, the candidate pixel is set as the pixels for the building region.

Meanwhile, in the case where nine sample pixels for matching are selected, as shown in Expression 1, the gray-level differences among the nine sample pixels for matching are computed using the Euclidean distance. If two or more pixels of the nine sample pixels for matching have smaller gray-level differences (Euclidean distances) with respect to the colors (gray levels) of the candidate pixels than the discrimination threshold for building region detection ($CM(i,j) \geq 2$), the candidate pixels are extracted as building region pixels.

In Expression 1, $CM(i,j)$ represents the number of the sample pixels for matching having a smaller degree of color matching for a pixel $(i,j)$ than the discrimination threshold for building region detection.

In Expression 2, $f(x)$ represents a function for discriminating whether a condition x is true or false. When x is true, $f(x)$ returns 1, and when x is false, $f(x)$ returns 0. TH represents a discrimination threshold for building region detection.

Expression 3 represents a value of the color (gray level) of the pixel $(i,j)$ (m=R, G, B).

Expression 4 represents a sample color for matching (gray level) (m=R, G, B).

Further, comparison matching is conducted between the candidate pixels and the pixels in the searching range for region detection around the candidate pixels as well as between the candidate pixels and the sample pixels for matching. In other words, the differences between the gray levels of the candidate pixels and the gray levels of the pixels in the searching range for region detection are computed using the Euclidean distances. Then, based on the comparison results between the distances and the discrimination threshold for building region detection, it is determined whether the candidate pixels are set as the pixels for the building region or not. More specifically, when the gray-level difference (Euclidean distance) is smaller than the discrimination threshold for building region detection, the candidate pixel is set as the pixel for the building region. When the gray-level difference is equal to or larger than the discrimination threshold for building region detection, the candidate pixel is not set as the pixel for the building region because the candidate pixel is discriminated as being excluded from the building region.

Figure 8:
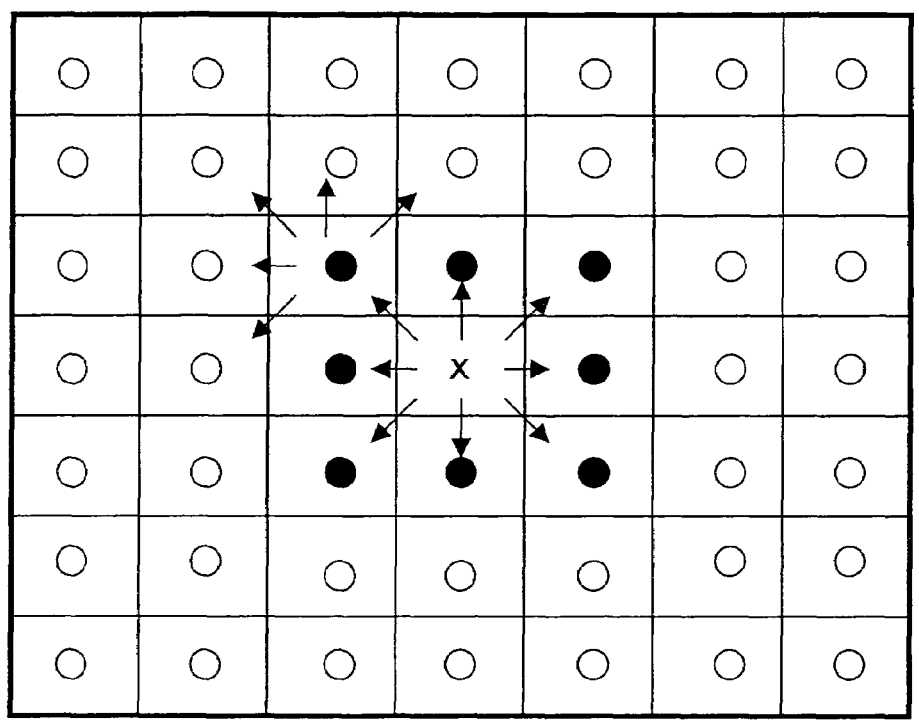
FIG. 8 is a diagram for explaining extraction of a building region according to the embodiment of the present invention.

As shown in FIG. 8, by repeating the above-mentioned process of step 702, the range of the building region is expanded toward the vicinities from the building region (appointed position) that has been already extracted, thereby extracting the building region.

Figure 9:
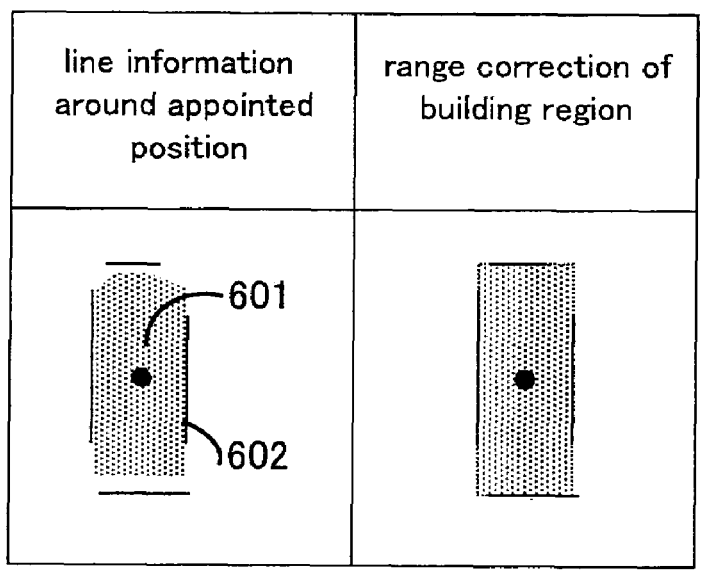
FIG. 9 is a diagram for explaining range correction of a building region according to the embodiment of the present invention.

Next, the building region is corrected (step 703). In the building region correction process, the building region is corrected using the information on the edge image obtained in step 701 in order to enhance an accuracy of extracting the building region. In other words, edge information of the edge image of the building region is used to link the pixels having the same gray gradient direction with each other by Hough transformation, and obtain an inclination angle for the gray gradient and end points of a line segment. After that, the obtained line information is used to correct the building region. In the correction process, as shown in FIG. 9, lines 602, which neighbor to each other so as to surround a building region 601 extracted in step 702, are selected, and the building region is expanded to the neighboring lines 602.

Next, a region inclination angle is computed (step 704). In the region inclination angle computation process, the longest boundary among the boundaries of the building region corrected in step 703 is selected to be set for the region inclination angle.

Next, the building region is rotated (step 705). In the building region rotation process, with respect to the region inclination angle obtained in step 704, linear transformation according to affine transformation and parallel displacement are conducted to rotate the building region. The building region is often formed of a rectangle or a combination of rectangles, so that the boundary becomes horizontal or vertical with respect to an axis direction. This makes it possible to simplify an operation for processing the polygon extraction, improve an operational speed, and enhance an operational accuracy.

Figure 10:
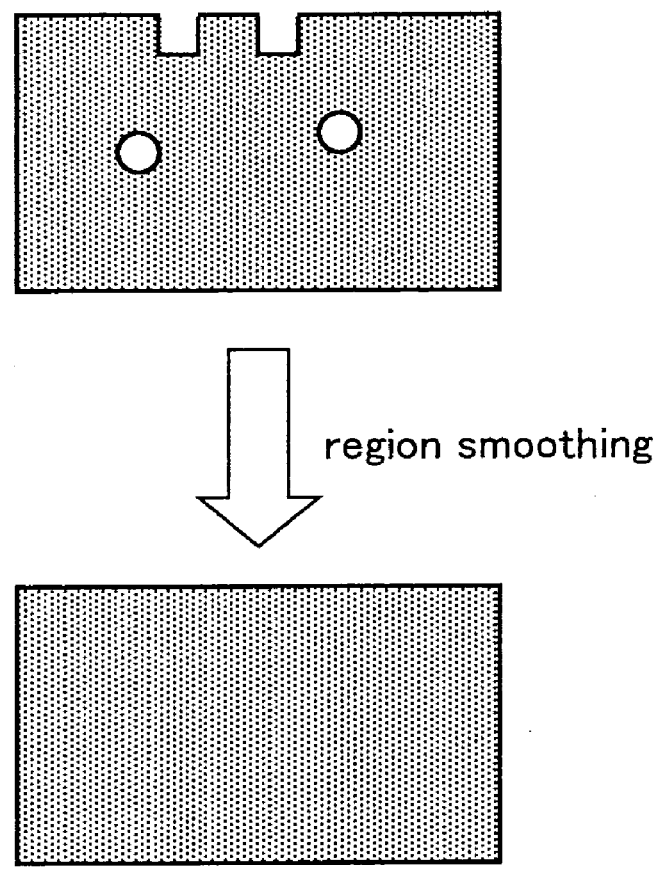
FIG. 10 is a diagram for explaining a building region smoothing process according to the embodiment of the present invention.

Next, smoothing is conducted on the building region (step 706). In the region smoothing process, as shown in FIG. 10, unevenness of the boundary of the building region is eliminated and corrected into a straight line. Also, a hole within the region is filled in to correct the building region.

Next, polygon lines of the building region are extracted (step 707). In the polygon line extraction process, vertices on the boundary of the building region are first detected as polygon feature points. Then, the polygon feature points are connected (traced) to thereby extract the polygon lines as vector information.

Next, a polygon line is corrected into a straight line (step 708). In the polygon line correction process, the polygon line composed of a plurality of short line segments is corrected into a single straight line. For example, short line segments that are connected in a zigzag manner (stepwise) are transformed into a single oblique line.

After that, the vector information of the polygon line of the building region is rotated in the reverse direction at the same angle as that in step 705 to return the building region to a normal direction.

As described above, according to the building region extraction process, the parameters for region extraction obtained in steps 503 and 504 are used to extract the building region including the appointed position. As a result, in the case where the building roof has a uniform color or has different colors depending on positions thereon, the building region can be extracted appropriately.

Further, according to the polygon line extraction process, the vertices of the polygon of the building region are extracted and traced to have a closed polygon shape. As a result, the vector information of the polygon lines of the building region can be obtained.

Figure 11:
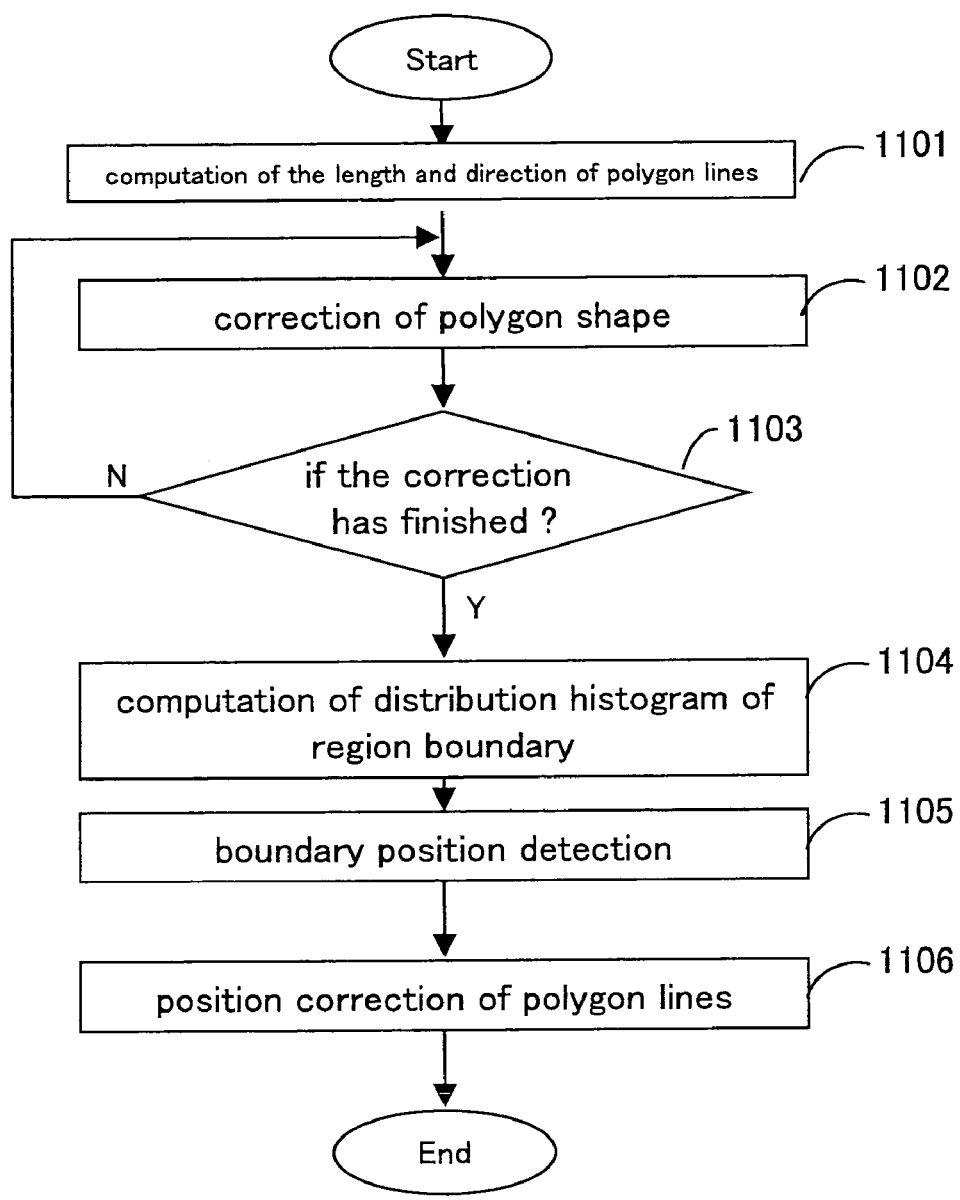
FIG. 11 is a flowchart of a polygon shape correction process according to the embodiment of the present invention.

FIG. 11 is a flowchart of the polygon shape correction (step 404 of FIG. 4).

In the polygon shape correction process, in order to further enhance an accuracy in building polygon shape, based on the fact that the building region is often formed of straight lines, the polygon lines of the building region are corrected so as to be aligned with the actual boundary of the building region. As the polygon shape correction, the correction of the polygon shape (steps 1101 to 1103) and the position correction of the polygon lines (steps 1104 to 1106) are conducted.

First, lengths and directions of the polygon lines of the building region are computed (step 1101). In the polygon line computation process, the length of each polygon line and an angle between each polygon line and the horizontal direction are computed.

Figure 12:
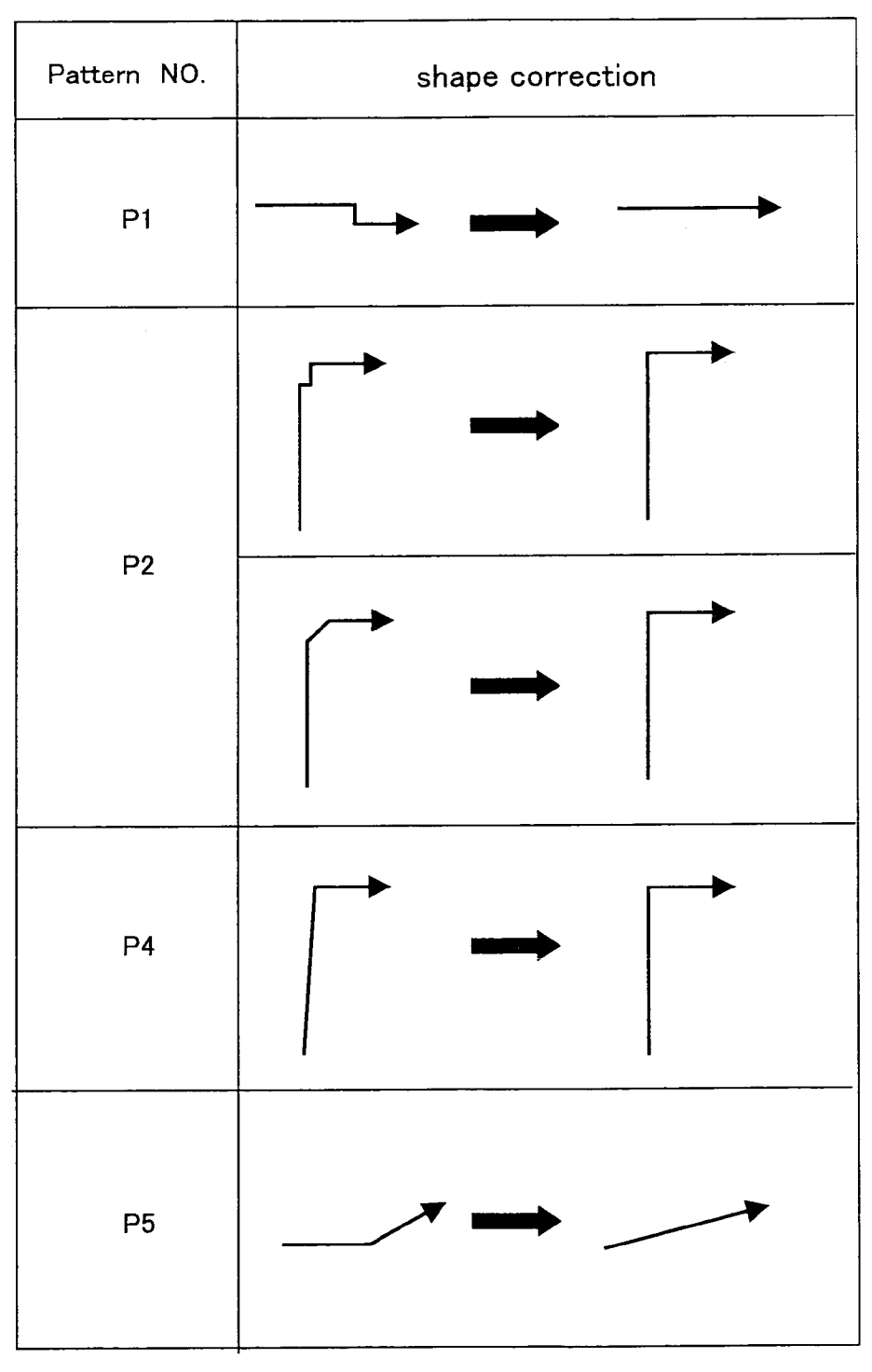

Next, the polygon shape is corrected (step 1102). In the polygon shape correction process, as shown in FIG. 12, the polygon line is corrected when the polygon line corresponds to a predetermined correction pattern. For example, in the case where a short line interposes between long lines, the three lines are judged as being a continuous straight line, and the short line is eliminated to connect the two long lines (P1 of FIG. 12). Alternatively, in the case where a short line exists near the intersection point between two lines, the two lines are judged as crossing, and the short line is eliminated to cross the two long lines (P2 of FIG. 12). Further, in the case where adjacent two straight lines are in a positional relationship of a substantially right angle (for example, the two lines cross at an angle of 85° to 95°), the two lines are judged as crossing at the right angle, and the intersection point between the two lines are corrected so as to form the right angle between the two long lines (P4 of FIG. 12). Furthermore, in the case where adjacent two straight lines cross at an angle of 170° to 190°, the two lines are judged as being a single line, and the two lines are integrated into a single straight line (P5 of FIG. 12).

Then, it is discriminated whether a line corresponding to a predetermined pattern remains in the polygon lines of the building region or not, and it is determined whether the whole shape correction has finished or not (step 1103). When the shape correction is discriminated as being unfinished, the procedure returns to step 1102 to further conduct the polygon shape correction process.

On the other hand, when the whole shape correction is discriminated as having finished, the procedure advances to step 1104 to compute a distribution histogram of the whole boundary lines of the building region. In the process for computation of region boundary distribution histogram (step 1104), the boundary lines are projected in the horizontal direction and the vertical direction to compute the distribution histogram of the boundary lines of the building region. The histograms are computed for all the extracted buildings, and a cumulative operation is conducted on the histograms for statistical process.

Next, a boundary position is detected (step 1105). In the boundary position detection process, peak positions of polygon line histograms are detected from the respective histograms in the horizontal direction and the vertical direction which are obtained in step 1104. The respective peak positions obtained in the horizontal and vertical directions are used to form a grid (composed of, for example, grid lines 1302 to 1305 shown in FIG. 13) on the image.

Figure 13:
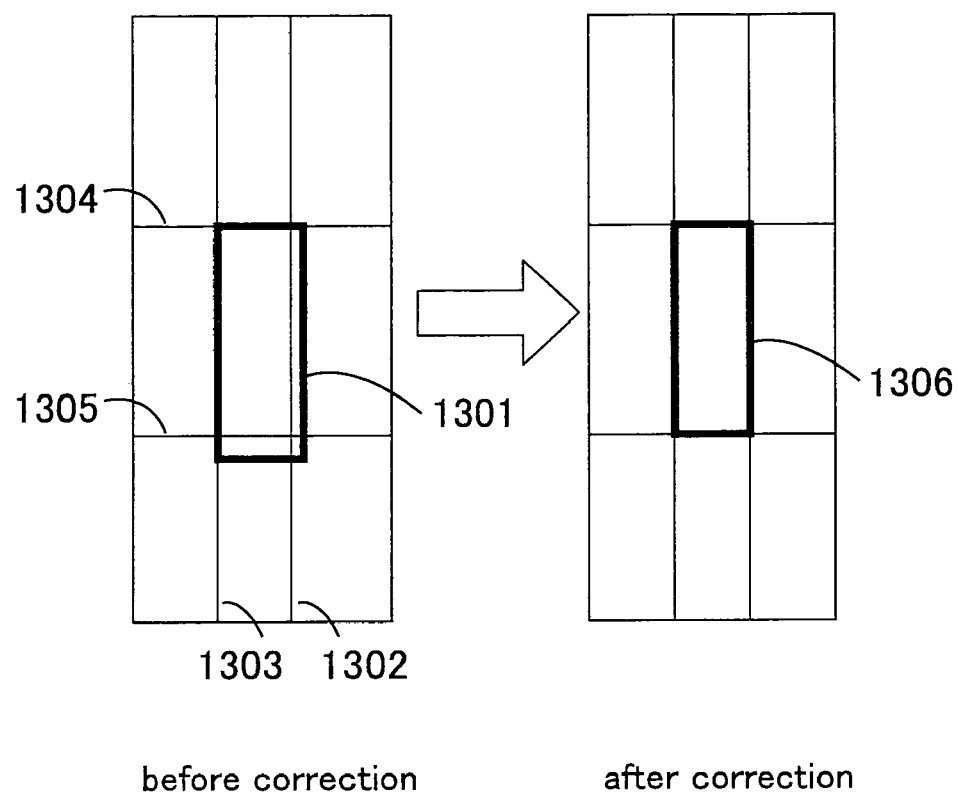
FIG. 13 is a diagram for explaining position correction of polygon lines according to the embodiment of the present invention.

Next, position correction of the polygon lines is conducted (step 1106). In the polygon position correction process, the polygon lines in the horizontal direction and the vertical direction are moved to a position of the nearest grid, and the polygon lines whose positions have been corrected can be obtained. For example, as shown in FIG. 13, the grid lines 1302 to 1305 formed in the peak positions of the histograms detected in the horizontal and vertical directions are used to move the position of a polygon 1301, and a polygon 1306 whose position has been corrected can be obtained.

As described above, according to the polygon shape correction process, the building polygon shape based on the features of the building polygon shape (that is, using the linearity or orthogonality of the building polygon lines) is corrected, making it possible to enhance the accuracy in building polygon shape. Further, according to the polygon position correction, since the building polygons are liable to gather in particular positions such as positions along a road, the building polygon shape is corrected into a correct position, making it possible to enhance the accuracy in position of the building polygon shape.

Figure 14:
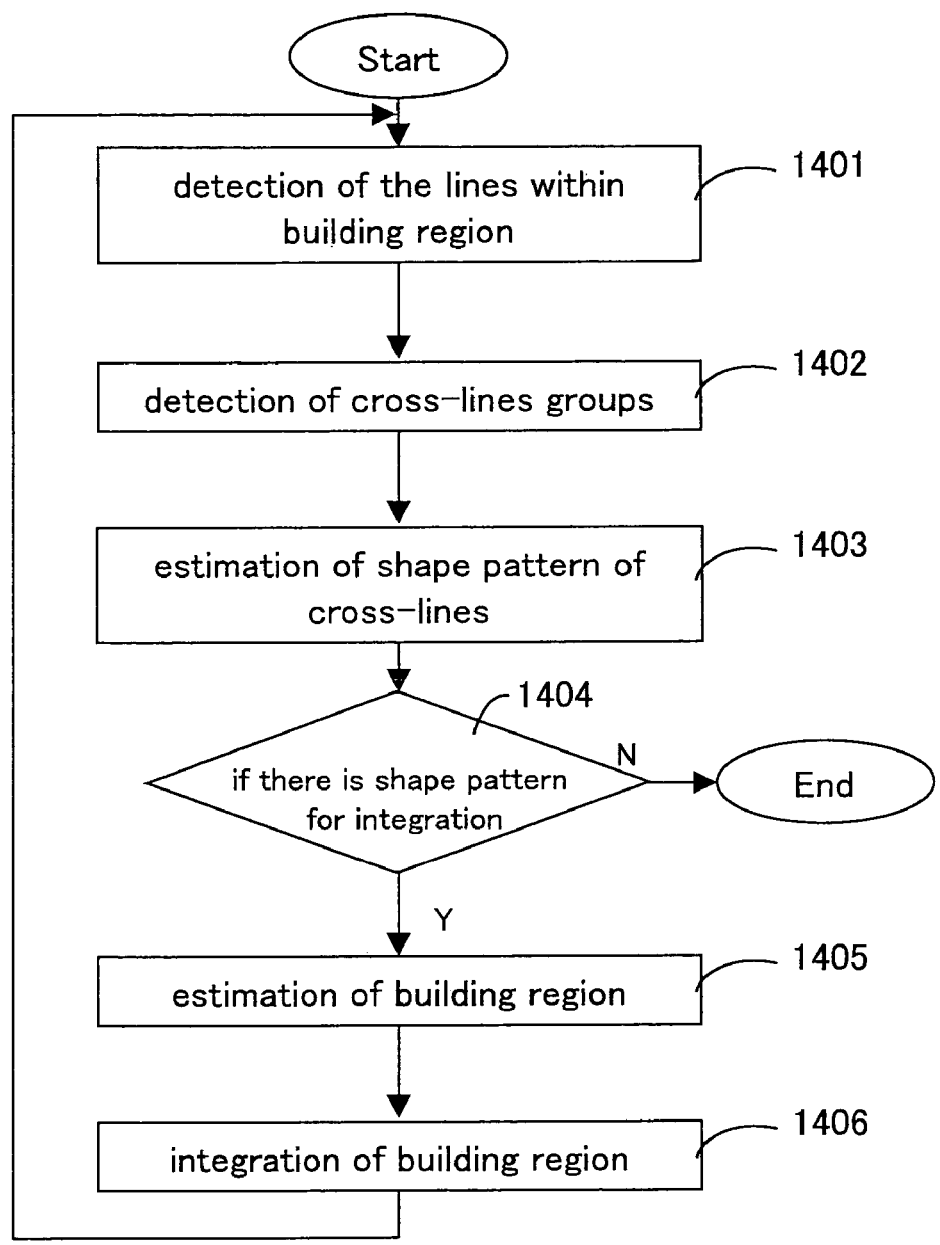
FIG. 14 is a flowchart of a building region integration process according to the embodiment of the present invention.

FIG. 14 is a flowchart of analysis and integration of the building region (step 405 of FIG. 4).

In the building region integration process, as in the case of, for example, the building with a gable roof, a building roof having an inclined surface causes a difference in color (gray level) of the roof surface depending on how the sunlight falls on the roof, and may be extracted as a different building region, so that a plurality of the building regions need to be integrated. Therefore, the building regions are integrated based on the boundary of the extracted building region and lines within the building region.

First, detection is conducted for the boundary of the building region and the lines within the building region (step 1401). In the line extraction process, the boundary of the building region extracted in step 703 and information on the lines within the building region are utilized to detect the line.

Next, the cross-line groups are detected (step 1402). In the cross-line group detection process, lines that cross each other are detected from among the lines extracted in step 1401, and the lines are grouped. Then, a crossing position and a crossing angle are computed for the grouped lines.

Next, a shape pattern of the cross-lines is discriminated (step 1403). In the process for discriminating the shape pattern of the cross-lines, it is discriminated whether the positional relationship (the crossing position and the crossing angle) of the cross-lines corresponds to any predetermined integration patterns shown in FIGS. 15 and 16 or not. More specifically, the integration patterns that show an upper portion structure of the building to be integrated include a T-shaped pattern in which one line contacts an end point of another line and the two lines are in an orthogonal relationship, an X-shaped pattern in which two lines cross each other, a Y-shaped pattern in which three lines meet at one point, and V-shaped patterns (having three types, V1, V2, and V3) in which one end of a line coincides with one end of another line.

Next, it is discriminated presence or absence of the corresponding integration pattern (step 1404). In the process for discriminating presence or absence of the corresponding integration pattern, it is discriminated whether the boundary of the building region or the lines inside the building region correspond to any integration patterns shown in FIGS. 15 and 16 or not. When there exist lines corresponding to any of the integration patterns T, X, Y, V1, V2, and V3, the procedure advances to the process of step 1405. When there exist no lines corresponding to any of the integration patterns, the process for integrating the building structure finishes.

Next, the building region is estimated (step 1405). In the building region estimation process, when the lines correspond to the integration pattern T, X, or Y shown in FIG. 15, an axis that passes the intersection point between the lines and has a smallest moment of the lines is obtained. Then, with the axis direction being set as a reference, the smallest range of a rectangle containing the lines that are composed of a crossing pattern is computed. Alternatively, when the lines correspond to the line pattern V1 or V3 shown in FIG. 16, with the direction of the longest line being set as a reference, the smallest range of a rectangle containing the lines that are composed of a crossing pattern is computed, and is included in the building region. Further, when the lines correspond to the line pattern V2 shown in FIG. 16, with a line orthogonal to a direction of the longest line being a center axis, it is estimated that the building region exists also in the opposite side, and this is also included in the building region.

Next, the building region is integrated (step 1406). In the building region integration process, a new building region is generated by adding the estimated building region to the original building region. After that, the procedure returns to step 1401, and the integration pattern is detected for the lines of a new building region.

Then, when the building structure integration process finishes, the procedure returns to step 402, and a polygon shape is extracted from a newly integrated building region (step 403). On the other hand, when there remains no building region to be integrated, the procedure advances to the process for ground projection of a polygon shape (step 406).

Figure 15:
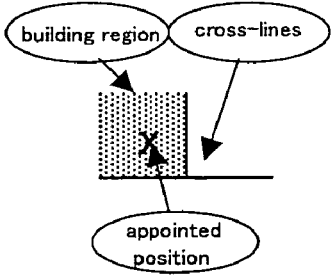
FIG. 15 is a diagram for explaining integration patterns for a building region according to the embodiment of the present invention.
Figure 15:
Figure 15:
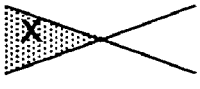
Figure 15:
Figure 15:
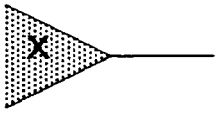
Figure 15:
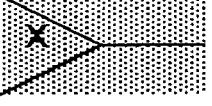
Figure 16:
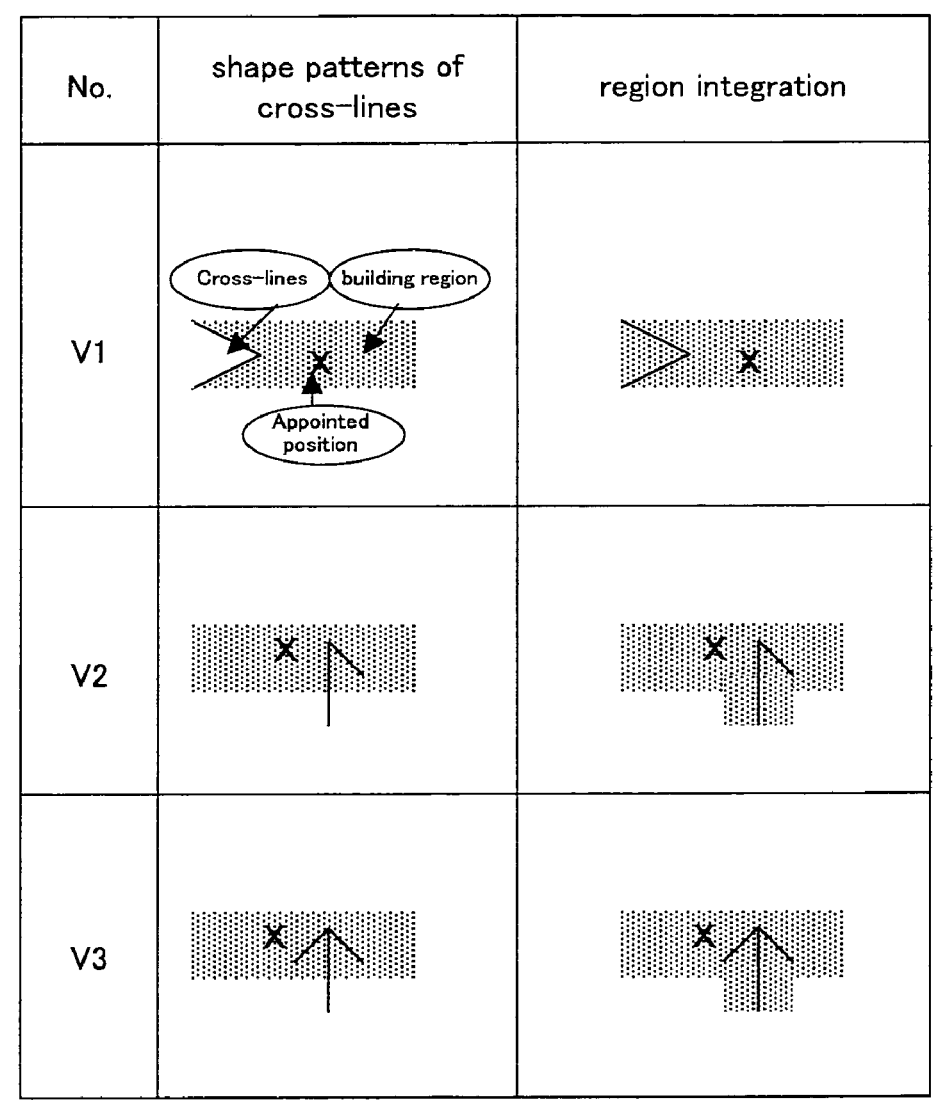

As to the building that cannot be integrated even by using the integration patterns shown in FIGS. 15 and 16, the operator appoints a building region composing one building to thereby integrate the building region.

As described above, according to the building region integration process, from the comparison results between the integration pattern predetermined based on building structural knowledge and the lines of the extracted building region, a plurality of upper portion structures included in the same building can be recognized and integrated, and the building having a more complex upper portion structure can be detected.

Figure 17:
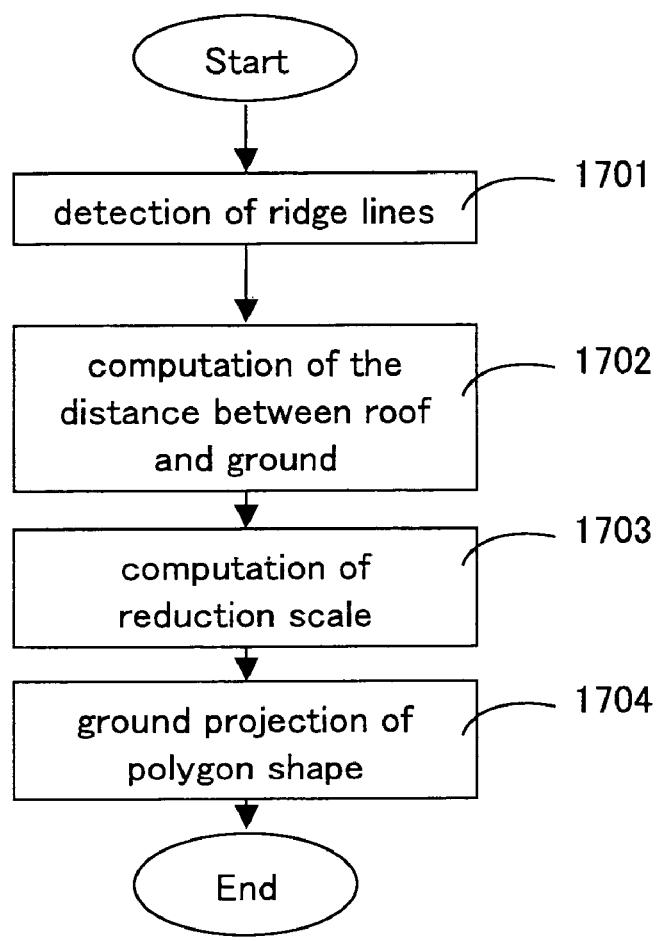
FIG. 17 is a flowchart of a process for ground projection of a polygon shape according to the embodiment of the present invention.

FIG. 17 is a flowchart of the process for ground projection of a polygon shape (step 406 of FIG. 4).

Figure 18:
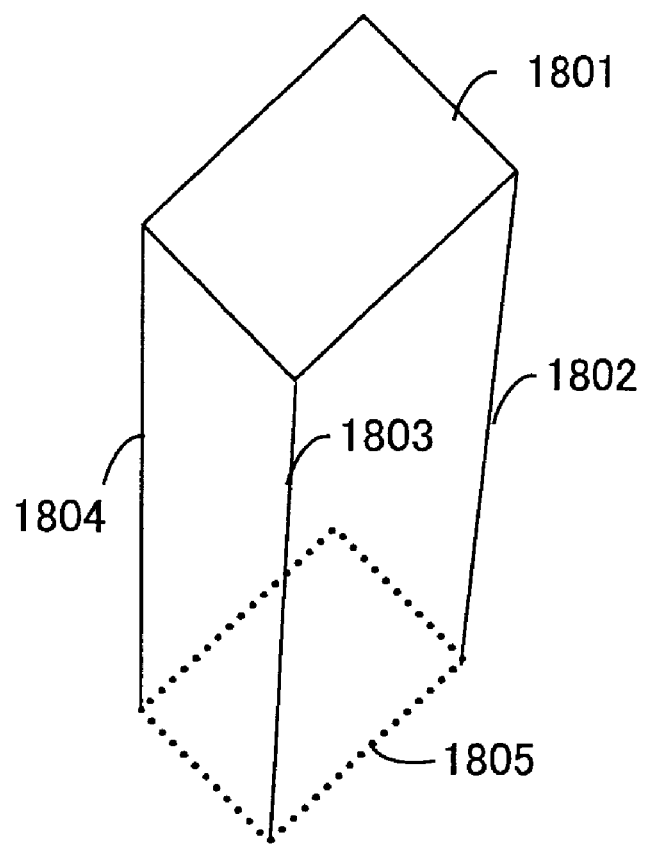
FIG. 18 is a diagram for explaining the ground projection of a polygon shape according to the embodiment of the present invention.

In the process for ground projection of a polygon shape, lines (ridge lines: 1802 to 1804 of FIG. 18) formed of arrises between building walls in the vertical direction are first detected (step 1701). In the ridge line detection process, the same method as in step 703 is used with respect to polygon information (1801 of FIG. 18) of the extracted building region to detect the ridge lines (1802 to 1804 of FIG. 18), whose difference between the length and the inclination angle is smaller than the predetermined threshold, around the vertices of the polygon shape.

Next, a distance between a roof and a ground is computed (step 1702). In the process for computation of the distance between a roof and a ground, a mean value is computed of the lengths of the detected ridge lines to be set as the distance between the roof and the ground.

Next, a reduction scale of a roof shape is computed (step 1703). In the process for computation of the reduction scale, ridge lines that extend from the periphery of two adjacent vertices of the roof shape are selected. Then, the reduction scale is computed of a polygon line of the roof shape located between the two ridge lines when the polygon line moves in parallel along the two ridge lines from the roof level to the ground level, to be set as the reduction scale of the roof shape.

Next, the polygon shape of the building region is projected on the ground (step 1704). In the ground projection process, the distance between the roof and the ground obtained in step 1702 and the reduction scale obtained in step 1703 are used to conduct linear transformation according to the affine transformation and parallel displacement on the polygon shape of the building region, thereby projecting the reduced polygon shape of the building region on the ground. As a result, the shape (1805 of FIG. 18) on the ground level can be obtained.

As described above, according to the process for ground projection of a polygon shape, the lines (ridge lines) formed of arrises between the building walls in the vertical direction are used to project the polygon of the building roof on the ground. Accordingly, a distorted image produced due to the position where the photograph was taken and the height of the building can be transformed into a shape on the ground level.

Figure 19:
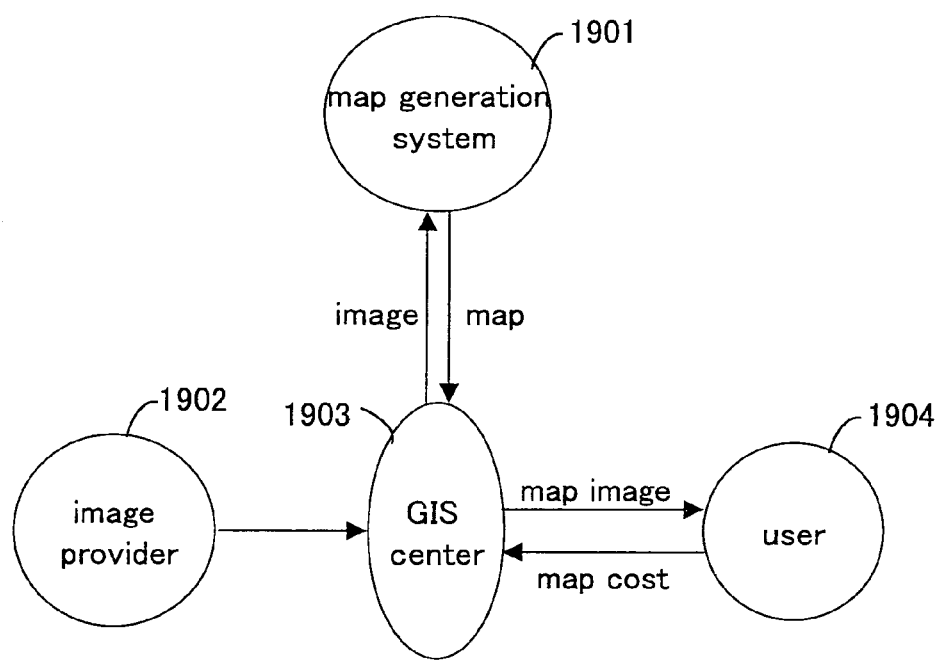
FIG. 19 is a diagram for explaining transmission of map information utilizing a map generation device according to the embodiment of the present invention.

Subsequently, description will be made of transmission of map information utilizing a map generation device according to the embodiment of the present invention. As shown in FIG. 19, a GIS center 1903 receives an order (map cost) from a user 1904, and causes the map generation device of the present invention to create a map having a detailed building polygon shapes by using an image received from an image provider 1902. At this time, information is added to associate the map creation source image with the created map. More specifically, the position of a building etc. within the map creation source image, which is appointed in the position appointment step according to the embodiment of the present invention, is associated with the building etc. within the created map by adding the same identification number to both or the like. In addition, roof data of each building (name, address, height, etc. of the building) can be stored while being associated with the complete map data.

The map associated with the image is provided to the user 1904.

According to all of the foregoing, the present invention may be practiced as a program (see, eg., flowcharts of FIGS. 4, 5 and 7) for causing a computer to execute a map generation method, the method including: receiving user appointment of at least one position in a building existing within an aerial photograph, to designate the at least one position as part of a building region; extracting pixels corresponding to an extracted building region based on a result of discriminating a color around the at least one position, and extracting a polygon line of the extracted building region; and generating a vector of the polygon line of the extracted building region. Other operations may be included, e.g.: analyzing colors around the at least one position to determine sample colors for discriminating, a discrimination threshold, and a region searching range; extracting building region pixels based on a result of discriminating a similarity between a color of a roof of a building in the region searching range and the sample colors for discriminating, and extracting a line around the extracted building region pixels as the polygon line.

Another program embodiment may include: extracting pixels largely different in color from adjacent pixels as edge pixels, and determining boundary lines based on the edge pixels; and expanding the extracted building region to the boundary lines to correct the extracted building region. Another may include: rotating the extracted building region so as to set the polygon line of the extracted building region in a predetermined axis direction; and smoothing the polygon line after the rotation. In another alternative embodiment, in a case where the polygon line extracted corresponds to a predetermined linking pattern, the program may effect correcting the polygon line to one of a straight line and lines crossing each other at a predetermined angle. As another variant, in a case where a line of a building roof corresponds to a predetermined integration pattern, the program may effect integrating the extracted building region so as to include the line; and integrating the building region including a plurality of inputted positions. Still further, in a case where the aerial photograph shows a building obliquely, the program may effect correcting distortion due to a height of the building, and projecting a building polygon shape on a ground.

What is claimed is:

1. A map generation device, comprising:
an image appointment unit that receives user appointment of at least one position in a building existing within a single optical 2D image to designate the at least one position as part of a building region;
a polygon extraction unit adapted to utilize the single optical 2D image exclusively, to extract at least one pixel from pixels within the building region based on a result of discriminating a color of the pixels around the building region to compare whether the pixels are within a color variance of a predetermined discrimination threshold, to set the building region to include extracted pixels as a portion of an extracted building region, and to repeat the extract and set operations to expand the extracted building region with more extracted pixels, and then to extract plural polygon lines of the extracted building region; and
a structural analysis and integration unit adapted to utilize the polygon lines which were extracted by the polygon extraction unit using the signal optical image exclusively, to detect a boundary of the building region and lines inside the building region, and to compare between a shape of detected lines and a predetermined shape pattern of cross lines;
wherein the structural analysis and integration unit estimates the building region based on the compared shape of the detected lines in a case where the lines inside the building region correspond to any predetermined integration patterns, and terminates a process for integrating the building structure in a case where there exist no lines corresponding to any of the integration patterns, and
wherein the polygon extraction unit generates a vector of a polygon line of the extracted building region which was estimated by the structural analysis and integration unit.

2. The map generation device according to claim 1, comprising a roof texture analysis unit that analyzes colors around the at least one position to determine sample colors for discriminating, the discrimination threshold, and a region searching range,
wherein the polygon extraction unit extracts at least one of the pixels to be included in the building region based on a result of discriminating a similarity between a color of the pixels in the region searching range and the sample colors for discriminating.

3. The map generation device according to claim 2, wherein the roof texture analysis unit extracts a plurality of pixels from a predetermined region including the at least one position, and determines the sample colors for discriminating, the discrimination threshold, and the region searching range based on a result of statistically analyzing colors of the plurality of pixels.

4. The map generation device according to claim 3, wherein the roof texture analysis unit expands the region of the discrimination threshold and reduces the region searching range when a variance is large in the colors of the plurality of pixels extracted from the predetermined region including the at least one position.

5. The map generation device according to claim 1, wherein the polygon extraction unit extracts pixels largely different in color from adjacent pixels as edge pixels, determines boundary lines based on the edge pixels, and expands the extracted building region to the boundary lines to correct the extracted building region.

6. The map generation device according to claim 1, wherein the polygon extraction unit rotates the extracted building region so as to set the polygon line of the extracted building region in a predetermined axis direction, and smoothes the polygon line.

7. The map generation device according to claim 1, comprising a polygon correction unit that, in a case where the polygon line extracted by the polygon extraction unit corresponds to a predetermined linking pattern, corrects the polygon line to one of a straight line and lines crossing each other at a predetermined angle.

8. The map generation device according to claim 1, wherein the structural analysis and integration unit, in a case where a line of a building roof corresponds to a predetermined integration pattern, integrates the extracted building region so as to include the line.

9. The map generation device according to claim 8, wherein the structural analysis and integration unit integrates the building region at least once by a plurality of inputted positions.

10. The map generation device according to claim 1, comprising a ground projection unit that, in a case where the single image shows a building obliquely, corrects distortion due to a height of the building, and projects a building polygon shape on a ground.

11. The map generation device according to claim 1, wherein the user appointment of the at least one position with respect to the image appointment unit is executed manually, and wherein the operations of the polygon extraction unit and the vector generation unit are executed automatically.

12. A map generation method, comprising:
receiving user appointment of at least one position in a building existing within a single optical 2D image, to designate the at least one position as part of a building region;

extracting, utilizing the single optical 2D image exclusively, at least one pixel from pixels within the building region based on a result of discriminating a color of the pixels around the building region to compare whether the pixels are within a color variance of a predetermined discrimination threshold, setting the building region to include extracted pixels as a portion of an extracted building region, and repeating the extracting and setting operations to expand the extracted building region with more extracted pixels, and then extracting plural polygon lines of the extracted building region as vector information; and using a structural analysis and integration unit to detect, utilizing the polygon lines which were extracted using the signal optical image exclusively, a boundary of the building region and lines inside the building region, and to compare between a shape of detected lines and a predetermined shape pattern of cross lines;

wherein the structural analysis and integration unit estimates the building region based on the compared shape of the detected lines in a case where the lines inside the building region correspond to any predetermined integration patterns, and terminates a process for integrating the building structure in a case where there exist no lines corresponding to any of the integration patterns, and generating a vector of a polygon line of the extracted building region which was estimated by the structural analysis and integration unit.

* * * * *